United States Patent [19]

Tanguy

[11] 4,046,924
[45] Sept. 6, 1977

[54] METHOD FOR PANCAKE COOKING

[75] Inventor: Pierre Tanguy, Dijon, France

[73] Assignee: Etud, Dijon, France

[21] Appl. No.: 642,301

[22] Filed: Dec. 19, 1975

Related U.S. Application Data

[62] Division of Ser. No. 473,227, May 24, 1974, Pat. No. 3,978,781.

[30] Foreign Application Priority Data

June 1, 1973 France ........................ 73.20016

[51] Int. Cl.² .................... A21B 1/48; A21D 8/06
[52] U.S. Cl. ................... 426/502; 426/389; 426/517; 426/523; 427/428
[58] Field of Search ........... 426/497, 391, 502, 523, 426/496, 389, 517; 427/428; 99/423, 443 R, 484, 353, 427, 424

[56] References Cited

U.S. PATENT DOCUMENTS

| | | | |
|---|---|---|---|
| 2,088,472 | 7/1937 | Freedlander | 427/428 X |
| 2,264,115 | 11/1941 | Grainger et al. | 426/502 X |
| 2,823,625 | 2/1958 | Oakes | 426/502 |
| 3,511,696 | 5/1970 | Murray | 427/428 |
| 3,533,833 | 10/1970 | Takahashi et al. | 427/428 X |
| 3,630,140 | 12/1971 | Marrie | 99/423 |
| 3,814,006 | 6/1974 | Giraud | 99/423 |
| 3,917,856 | 11/1975 | Wong et al. | 426/502 X |
| 3,937,137 | 2/1976 | Marrie | 99/423 |

Primary Examiner—S. Leon Bashore
Assistant Examiner—Kenneth M. Schor
Attorney, Agent, or Firm—Bacon & Thomas

[57] ABSTRACT

Method and apparatus for applying a cooking mix to the rotary cooking drum of an automatic machine for making pancakes or the like by means of a continuously rotating paste-entraining roller partly immersed to a substantially constant depth in a mix tank, the film of mix being entrained by adhesion on the surface of the roller and contacting movable means for partly retaining this film, resulting in the formation of a bead of mix which touches lightly upon the surface of the cooking drum and thus coats it.

1 Claim, 30 Drawing Figures

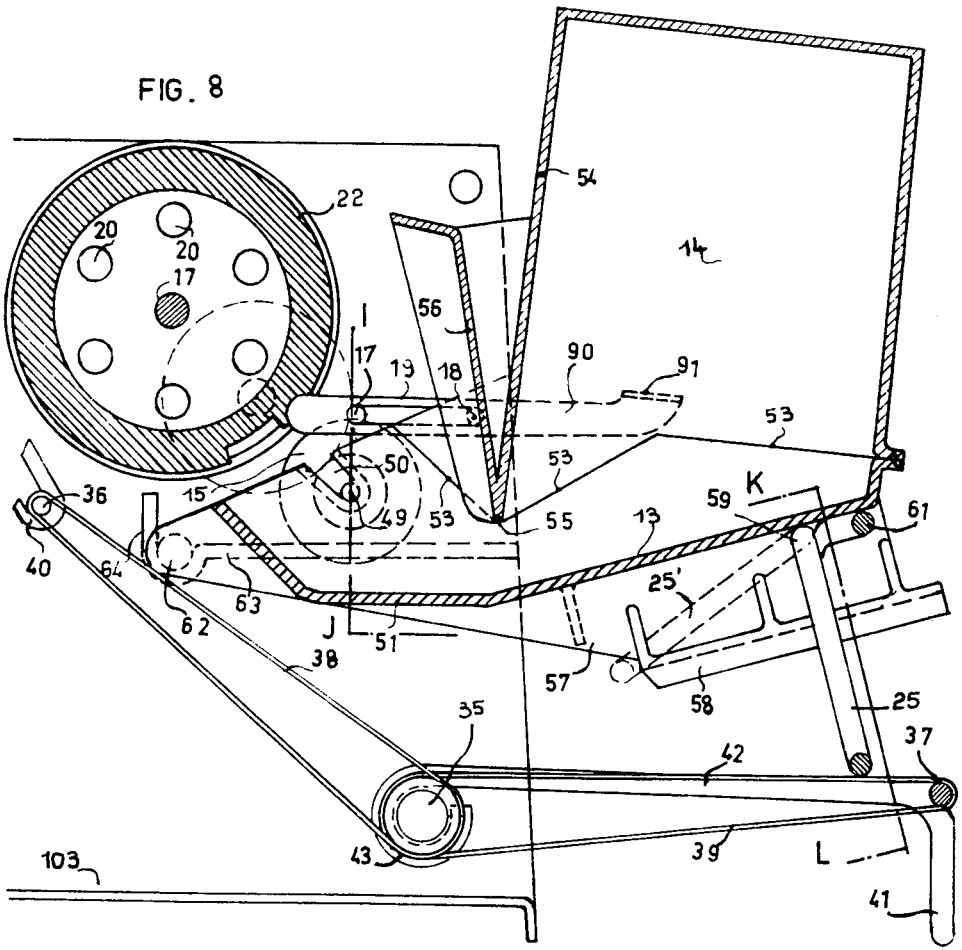
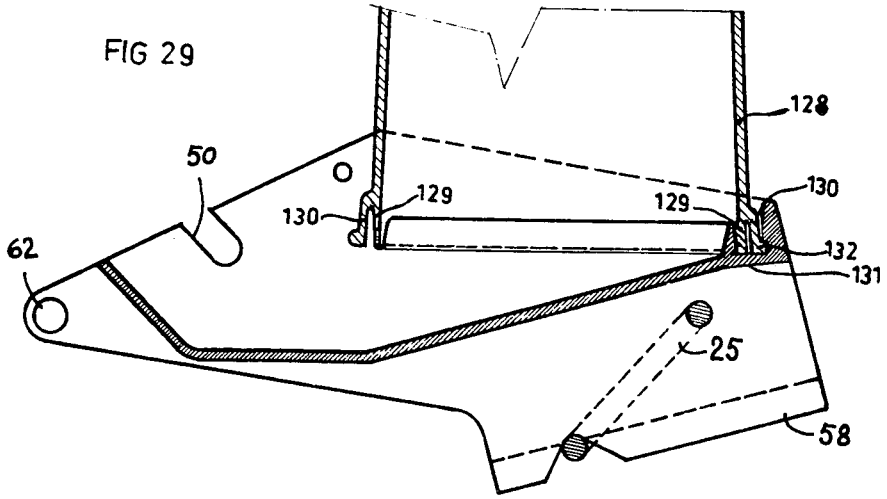

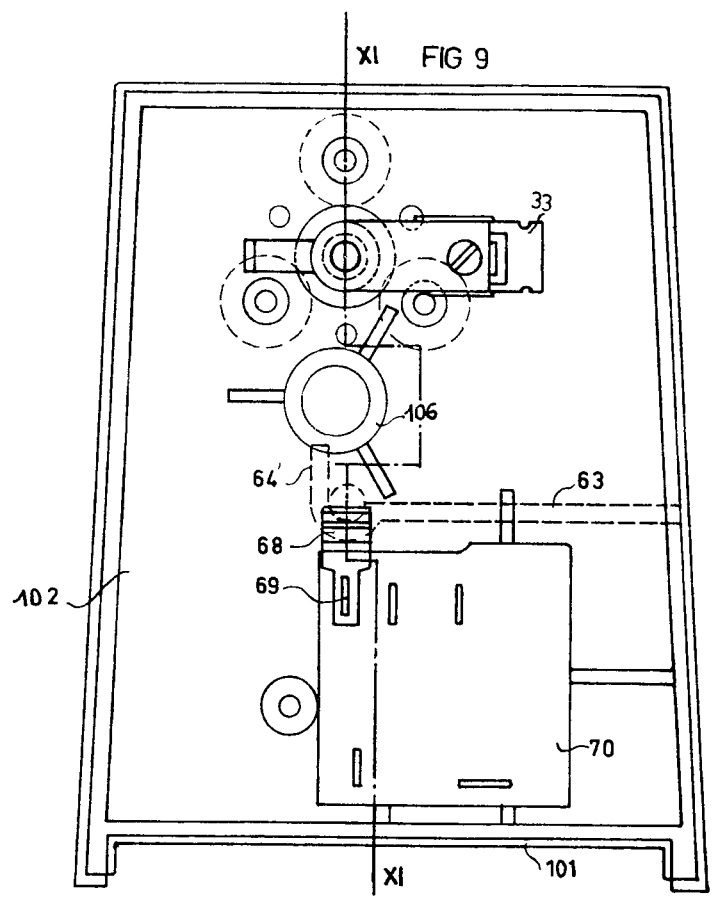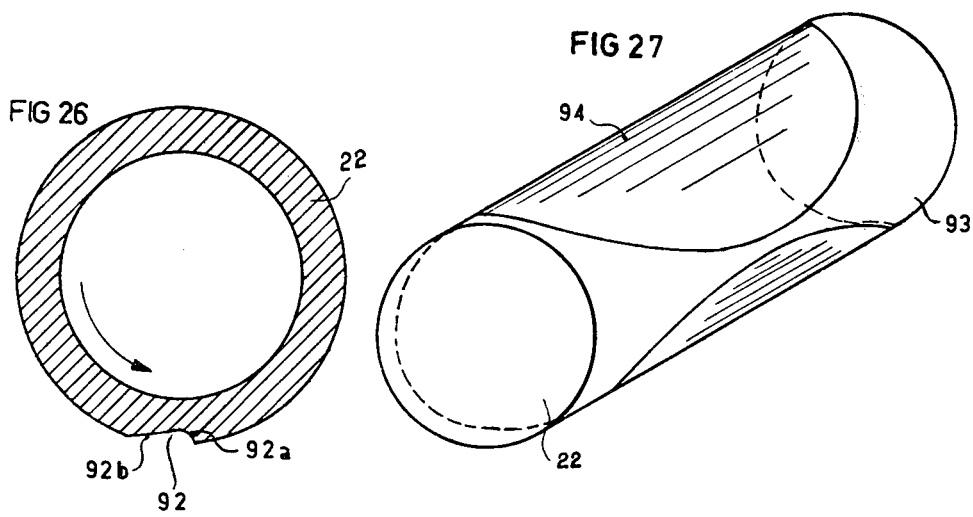

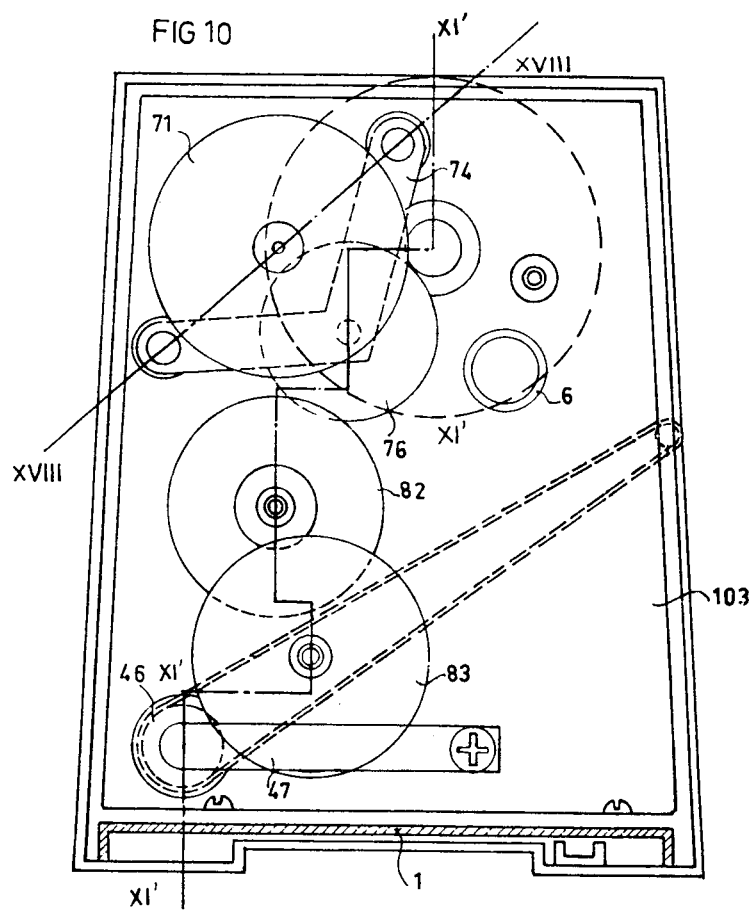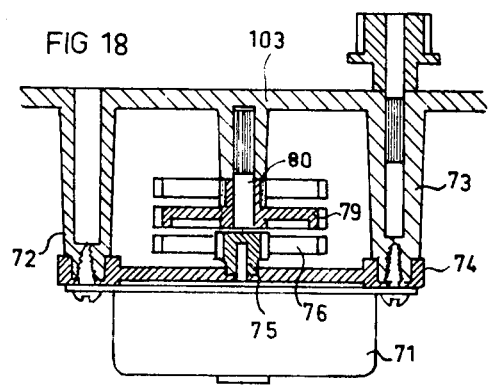

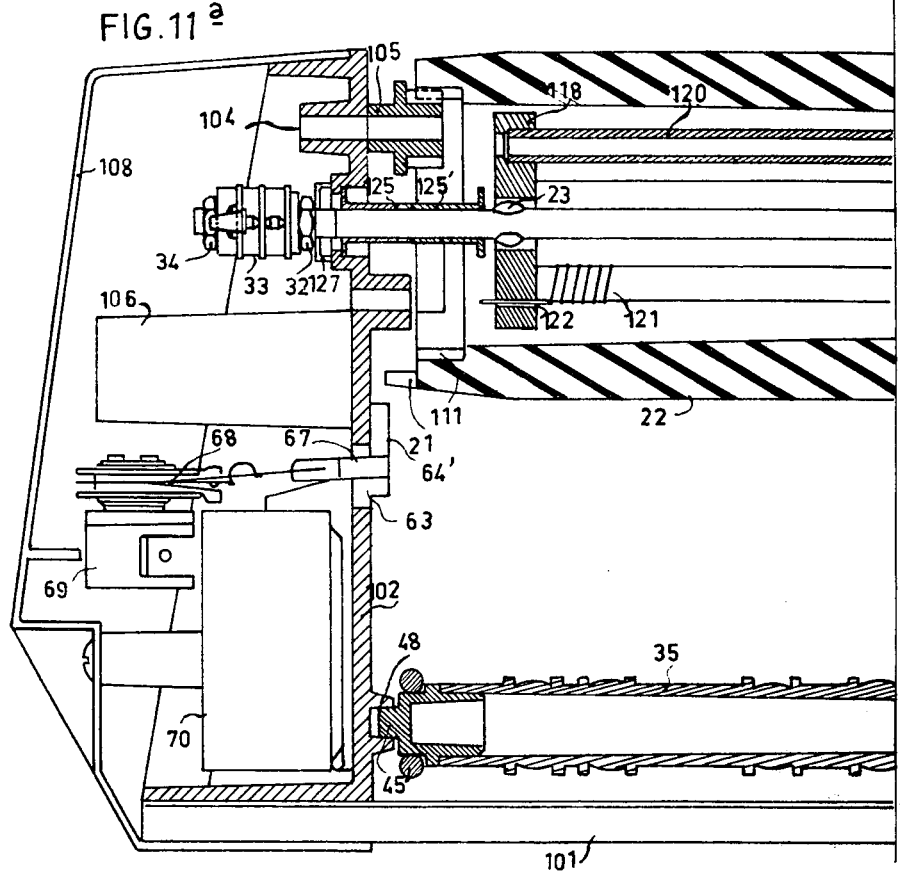

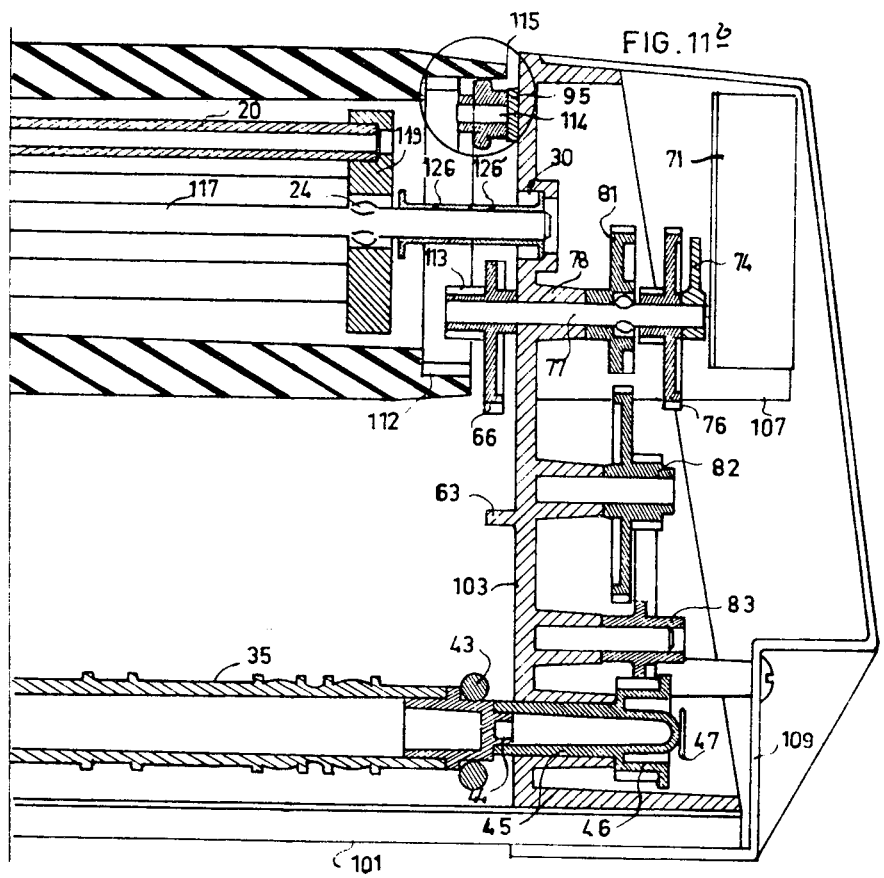
FIG. 11<sup>b</sup>
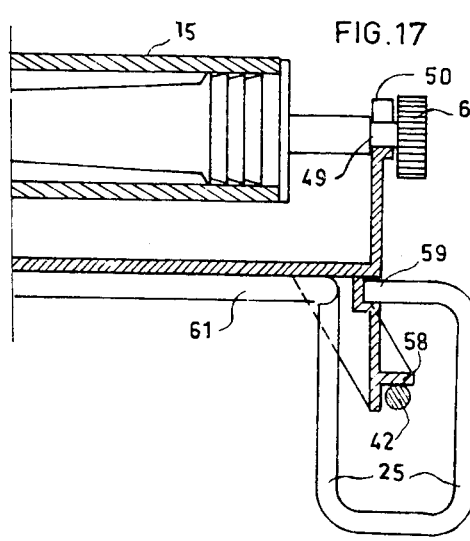
FIG. 17
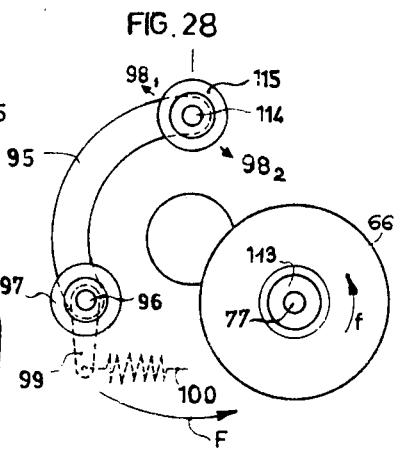
FIG. 28

METHOD FOR PANCAKE COOKING

This is a division of application Ser. No. 473,227 filed May 24, 1976 now U.S. Pat. No. 3,978,781.

BACKGROUND TO THE INVENTION

This invention relates to automatic machines for making pancakes on a rotating cooking drum whose surface can be smooth or can have a relief section depending upon the shape to be given to the pancakes.

PRIOR ART

Various means for applying pancake mix to a cooking surface of this kind have already been proposed, including periodic immersion of the cylindrical surface in the pancake mix to a substantially constant depth, depositing the paste by stripping an applicator roll which, as it rotates, dips to a substantially constant depth into a tank containing the pancake mix, free flow of the mix accommodated in a variable-opening hopper, etc.

All these systems are attended by various disadvantages: heating of the mix, which only enables the machine to operate for a short period of time, machining difficulties and the need to install control systems which increases the cost of the machines to such an extent that their retail price is incompatible with marketing on a large scale.

OBJECT OF THE INVENTION

The object of the present invention is to obviate these various disadvantages, namely to reduce heating of the pancake mix to a considerable extent, to simplify the design of the machine in such a way that there is no longer any need for complex adjustments to be made by the domestic or professional user, to control the temperature of the cooking drum automatically by reducing the input of calories when the machine moves from its working position to its waiting position.

BRIEF SUMMARY OF THE INVENTION

The invention relates to a method of applying a cooking mix to the cooking drum of an automatic machine for making pancakes or other similar products by means of a continuously rotating entraining roller partly immersed to a substantially constant depth in a tank accommodating the mix, distinguished by the fact that the film of mix entrained by adhesion on the surface of said roller comes into contact before the cooking surface with mobile means for partly retaining this film which results in the formation of a "bead" of mix which touches gently upon and coats the surface of the cooking drum with continuous return of the excess mix to the tank, the controlled mobility of these means enabling formation of the bead to be interrupted at any required moment to stop coating of the drum.

FURTHER FEATURES OF THE INVENTION

As will be seen in the following, the film-retaining means can vary, although Applicants prefer the following arrangement.

Since the two smooth, rotating surfaces of the drum and roller converge towards one another, a stripper bar is arranged immediately after the zone where the two surfaces are at their closest to one another, and is dimensioned in its cross-section in such a way that th bead flows over it during coating, the cooking drum being provided at one end with a projection which acts periodically on a pivot arm of the bar so that the bar is momentarily lifted in the radial direction and coating of the cooking drum interrupted while the bar is raised.

Various arrangements for carrying out the coating method according to the invention will be briefly described hereinafter, followed by a detailed description of a preferred embodiment of the invention, in which the coating system, essentially comprising a constant-level tank of mix with a feed reservoir and the drive roller equipped with its stripping bar, forms a separate unit of the machine.

According to another aspect of the invention, this separable unit can occupy two positions, namely a working position and a waiting position, the movement of the unit from one position to the other producing, through the connection or disconnection of a resistance, a corresponding variation in the input of calories to the cooking drum which is designed and arranged in such a way that the necessary regulation of temperature is made by balancing the input of calories with the natural losses of the drum.

BRIEF DESCRIPTION OF THE DRAWINGS

The accompanying drawing diagrammatically illustrates various embodiments of the arrangements which can be used for carrying out the coating method according to the invention, together with one complete, detailed embodiment of an automatic machine for making pancakes equipped with one of these arrangements, with electrical circuit diagrams, in particular for heating the cooking drum.

In the accompanying drawings:

FIG. 8 is a more detailed version of FIG. 5 in the form of a cross-section through a complete machine equipped with this variant of the coating system for a smooth-surface cooking drum.

FIG. 9 is an elevation taken from the left-hand side of the machine with the cover removed.

FIG. 10 is an elevation taken from the right-hand machine with the cover removed.

FIG. 11 is a cross-section through the machine, the left-hand half-view being taken on the line XI—XI of FIG. 9, and the right-hand half-view of the lines XI′λ —XI′ of FIG. 10.

FIG. 17 is a section through the reservoir on a vertical axial plane of the driving roller.

FIG. 18 is a section on the line XVIII—XVIII of FIG. 10.

FIGS. 26 and 27 are two variants of the surface geometry of the cooking drum.

FIG. 28 is a view of a mechanism for automatically taking up play to enable the cooking drum to be driven by smooth rollers.

FIG. 29 is a variant of FIG. 14 in which the reservoir is in two halves which can be taken apart to facilitate its cleaning.

DESCRIPTION OF EMBODIMENTS

Figure 1:
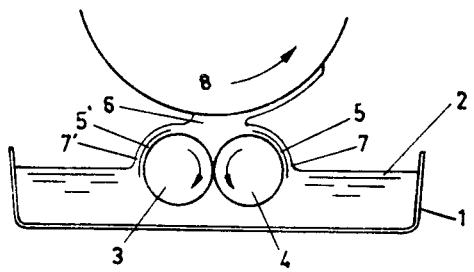
FIG. 1 is a diagrammatic cross-section through a symmetrical arrangement with a second roller rotating tangentially in the opposite direction to the driving roller.

As shown in FIG. 1, a certain quantity of cooking mix is kept at a substantially constant level 2 in a tank 1: 4 is the driving roller against which a second identical roller 3 is tangentially applied, the two rollers being partly immersed in the mix and rotating in the arrowed directions. The mix adhering to the rollers at 5 and 5' accumulates at 6 between the two rollers above their contact point and returns to the tank by flowing over the ascending film of mix, shown here at 7 and 7'. If a cooking drum 8 heated to a suitable temperature is positioned above this arrangement, the paste situated at the top of the bead 6 comes into contact with and remains adhering to the hot surface. The quantity of mix 7 and 7' returning to the tank decreases. However, it is essential for the mix to return to the tank without the level of the bead being decreased by an inadequate supply, which would give rise to "deficits" on the surface of the cooking drum. If the driving rollers 3 and 4 are moved apart whilst at the same time kept rotating, the bead 6 disappears, which stops coating of the cooking drum. Coating recommences when the rollers are brought together again.

This arrangement under the cooking drum is hardly practical for designing an automatic machine in which it would be necessary to release and convey the product outside the machine. Accordingly, it is of advantage to arrange the coating system at the side of the cooking drum.

Figure 2:
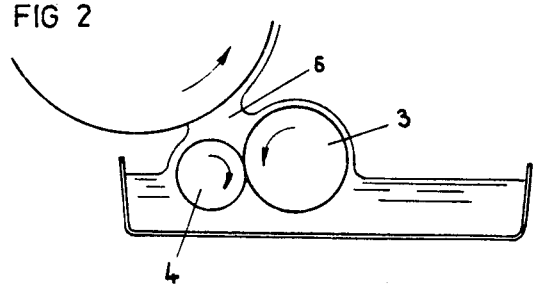
FIG. 2 is the same view of an arrangement with two tangential rollers, except that in this case the two rollers are offset relative to a vertical diametral plane of the cooking drum.
Figure 3:
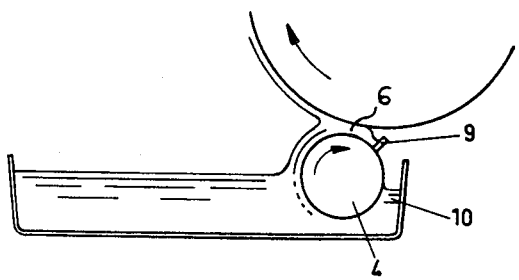
FIG. 3 is a similar diagrammatic view in which the second roller is replaced by a fixed bar or scraper.

FIG. 2 illustrates one embodiment of such an arrangement. This embodiment again comprises the driving roller 4, the second roller 3 of larger diameter and the formation of a bead of mix 6. This arrangement is not altogether satisfactory because the bead 6 is not stable. However, the roller 3 does not have to be rotated, which leads to the arrangement illustrated in FIG. 3, where the roller is replaced by a fixed bar 9 which stops the ascending film of mix and also produces the formation of bead in front of the bar 9.

Figure 4:
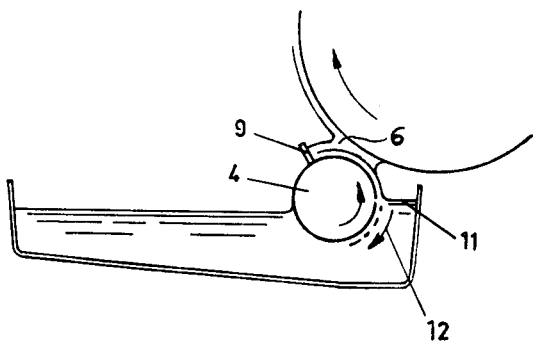
FIG. 4 is the same as FIG. 3, except that the bar is arranged in such a way that it can be radially displaced relative to the coating roller.

In another more advantageous arrangement, the driving roller is rotated in the opposite direction, as shown in FIG. 4, whilst the bar 9 is positioned in the immediate vicinity of the top of said roller. In this case, the bar is perfectly stable. In addition, the bar is exposed to less infrared radiation from the cooking drum. It can readily be lifted to make the bead disappear and, hence, to stop coating.

A phenomenon due to the molecular entrainment of the mix by rotation of the roller is somewhat troublesome in this arrangement. In the arrangement illustrated in FIG. 3, the level of mix at 10 tends to drop with the result that the tank below the cooking drum is barely used. By contrast, in the arrangement shown in FIG. 4, the level at 11 rises to a point where it overflows. This disadvantage is obviated by creating a sufficiently large space between the walls of the tank and the driving roller to promote return of the mix below the roller, as shown here by the arrow 12.

Figure 5:
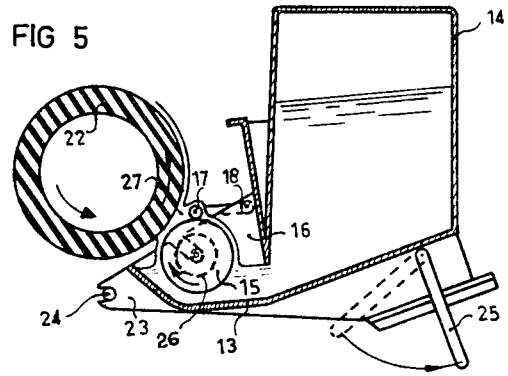
FIG. 5 is a diagrammatic cross-section through the cooking drum with the complete coating system designed as shown in FIG. 4.
Figure 6:
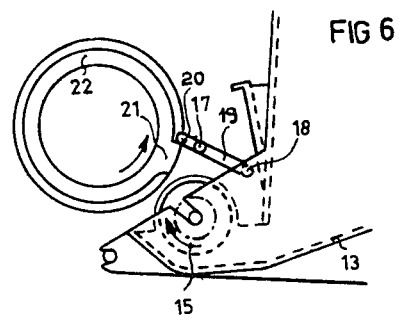
FIG. 6 is the same as FIG. 5, except that the bar is assumed to have been raised, thus interrupting coating of the drum.
Figure 7:
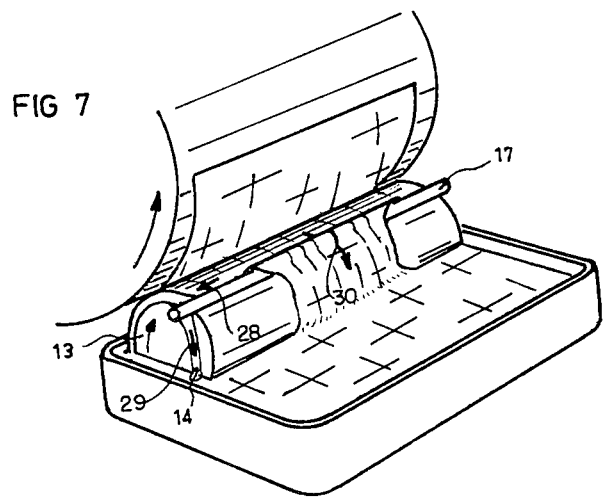
FIG. 7 is a perspective view of the arrangement shown in FIGS. 5 and 6 showing the paths followed by the strands of mix around the driving roller.

A coating system for a smooth cooking drum and for square pancakes, as illustrated in simplified form in FIGS. 5 to 7, can be made up from this more advantageous design illustrated in FIG. 4.

The mix tank 13 is an integral part of the mix reservoir 14. The driving roller 15 is mounted in the sides 16 of the tank. The bar 17 rests freely on the drive roller and is pivotally connected at 18 to the sides of the tank. The pivotal arm 19 is extended by a lever 20 which can be actuated by a projection 21 arranged at the end of the cooking drum 22.

The mix tank is introduced into the machine by engaging the forks 23 around studs 24 fixed to the frame supporting the cooking drum, and by pivoting the handles 25 which ultimately rest on the metal framework of the conveyor (not shown). Lowering of the handles 25 into the position illustrated in FIG. 5 rotates the tank-/reservoir block towards the front, with the result that the pinion 26 integral with the shaft of the drive roller 15 meshes with a driving pinion (not shown). Since the cooking drum 22 rotates permanently, as does the aforementioned drive pinion, the drive roller begins to rotate as soon as it engages the drive pinion. A film of mix adhering to the drive roller is then formed by the bead 27 which, as soon as it has become sufficiently coherent, touches lightly upon the hot surface of the cooking drum. A layer of mix remains adhering to the cooking drum where it forms a band of mix.

During each revolution, the projection 21 engages the end of the lever 20, the immediate effect of which is to allow the bead of paste to flow towards the tank (FIG. 6). Coating of the cooking cylinder then stops, starting again when the bar 17 is lowered.

In order to stop making pancakes, it is sufficient either to keep the bar 17 raised or to release the tank by folding the handles 25 underneath the tank. The bead then moves away from the surface of the cooking drum.

If the arrangement which has just been described is to function satisfactorily, the bar 17 should be of limited thickness. For example, a round wire of stainless steel 2 mm in diameter is suitable for a drive roller 24 mm in diameter rotating at a speed of 20 rpm in front of an aluminium cooking drum heated to 220° C and rotating at 15 rpm. The permanent overflow promotes the uniformity of the bead along the bar. FIG. 7 illustrates the phenomenon which occurs. Towards the ends of the drive roller, the mix, instead of forming a bead by accumulating in front of the bar, permanently escapes at the side of the roller in the direction of the arrow 28 and the flow 29. If the bar is sufficiently limited in thickness, a flow of mix is established in the central zone 30 above said bar to the detriment of the flow 28. Although smaller, the bead remains sufficiently large to continue performing its coating function, and remains substantially uniform in thickness up to the ends of the drive roller.

The heating which the mix can undergo in coming into contact with the cooking drum is considerably reduced by this permanent return of mix to the reserve of fresh mix accommodated in the tank. The heated mix is permanently recycled by the drive roller whilst, as it is consumed, fresh paste coming from the reservoir 14 keeps the temperature at an acceptable level.

In addition to working satisfactorily, the system illustrated in FIGS. 5 to 7 is advantageous in terms of domestic application, because it does not impose any strict tolerances on the manufacturing side, neither is any delicate mechanism required to start or stop coating.

A complete machine equipped with this system will now be described in detail with reference in particular to FIGS. 8 to 11.

As shown in FIGS. 11a and 11b, the frame of the machine consists of a stainless steel baseplate 101, to the ends of which are fixed two side plates 102 and 103 made of a thermoplastic plastics material or of aluminium, moulded with all the projections and orifices required, for example, the vents 106 and 107 are the anchoring points for a scraper blade or wire (not shown) by which the pancakes cooked on the cooking drum 22 are removed. Each side plate receives the grooved shafts 104 on which are mounted toothed wheels 105 which engage in the internally toothed rings 111 and 112 provided at each end of the cooking drum 22 made of injected aluminium. This internal arrangement of the rollers protects them, with the result that their rotation is always uniform.

At the right-hand end, rotation of the drum 22 is obtained by one of the toothed wheels 113 from a mechanical transmission as will be explained hereinafter.

At the left-hand end, there is a moulded projection 21 whose function it is to lift the scraper bar 17 with each revolution by acting on the lever 20.

The mounting between each internally toothed ring 111, 112 and the toothed wheels 105 (including the wheel 113) of each end is made without any play, i.e. during heating, and even in the event of overheating, a functional clearance is established through a slight increase in the original diameter of the rings, which enables the cooking drum to rotate freely.

A bore moulded in the drum 22 receives the shaft 117 of refractory steel on which is mounted a heating element in the form of two end steatite cylinders 118 and 119, between which are fitted tubular bars 120 also of steatite, the bars receiving coils 121 of nickel-chrome wire (held in position by passing them through openings 122 in the cylinders. This heating circuit will be discussed again hereinafter.

Axial displacement is limited by the tube sections 125, 125', 126, 126' and the washer 127, this washer being designed to fit against the bore, the arrangement being vented by openings formed in the tube sections and the washer. The tube section 125 is spot-welded to the shaft 117 and fixed at its left-hand end by a nut 32 screwed onto the threaded end of the shaft 117, the other right-hand end of the shaft being able to expand freely in the tube sections 126, 126'.

A temperature limiter 33 is held at the left-hand end of the shaft 117 between the nuts 34 and 32, the temperature transmitted to this limiter being proportional to the temperature of the cooking drum 22, i.e. it detects an "image" of this temperature.

The cooking drum 22 is made in such a way that the mass of insulating material is low in relation to the heat-conductive mass.

At the bottom of FIG. 8 can be seen the conveyor onto which the cooked pancakes are dropped by gravity, being removed at the lower end of the cooking drum 22 by the separator or release wire.

This conveyor is mounted on the drive roller 35 (shown in axial section at the bottom of FIG. 11) and on two tension bars 36 and 37 arranged on either side of this drive roller at different levels (FIG. 8).

Figure 12:
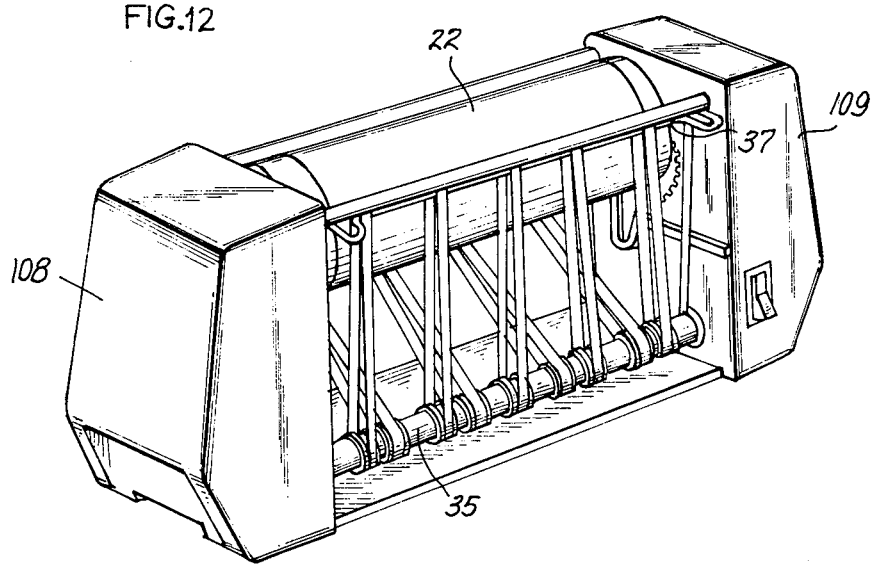
FIG. 12 is a perspective view of the machine without its coating system but with the conveyor for cooked folded pancakes.
Figure 13:
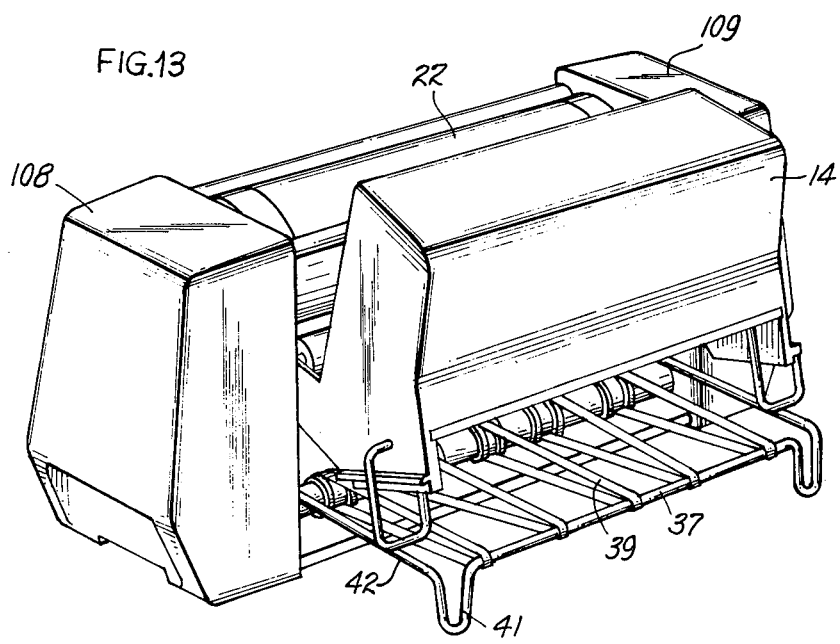
FIG. 13 is a perspective view of the machine ready for use.

Two sets of rubber rings 38 and 39 are stretched reciprocally between the drive roller and each of the tension bars. The rubber rings are identical so as to facilitate their supply and repositioning in the event of dismantling. The rear bar 36 is engaged in slots 40 directed in the stretching direction which are formed during the moulding of the side plates 102 and 103. Accordingly, they can be readily dismantled. The front bar 37 is an integral part of a reinforcement of stainless steel wire folded in a certain configuration comprising supporting feet 41, arms 42 and loops 43. The loops 43 are pivotally connected to the end of the drive roller 35, which enables the front section of the conveyor to be lifted as shown in FIG. 12. FIG. 13 shows the conveyor in its working position.

The drive roller is arranged in position by engaging a stud formed at each of its ends (FIG. 11) in the hollow part of the drive shaft 45 equipped with a toothed drive pinion 46 and designed to retract into the side plate and to reassume its position under the effect of the leaf spring 47 (see also FIG. 10). After having lowered the drive shaft 45, the other end of the drive roller is brought in front of the cavity 48, the spring 47 being allowed to act in such a way that the stud 45' engages in said cavity 48 (FIG. 11). If care has been taken to arrange the rings 39 on the bar 37 and to engage the ends of the roller 35 in the loops 43, it is sufficient to pass the bar 36 through the other rings 38 and to position said bar 36 in the slots 40, after which the conveyor is fully mounted.

By virtue of the foregoing preliminary description, it will readily be possible to understand in the following the structure of the coating system for the cooking drum, its positioning and its use in the machine.

The spindles 49, see FIG. 8, of the roller 15 entraining the mix engage in open bearings 50 whose opening is directed in such a way that the spindles remain in place in the positions which the coating tank is capable of assuming and under the reactive engaging force to which it is subjected during its driving.

The two open bearings 50 are formed at the ends of the tank 13 surmounted by the reservoir 14. These latter two components are assembled by ultrasonic welding at the level 53 the front face 54 of the reservoir 14 dips into the tank to the level 55 at which the mix is to be kept. This same front face 54 is moulded with an antispill surface 56.

The sides of the tank section extend downwards at 57 and terminate in flat surfaces 58 designed to fit the arms 42 of the conveyor. The flanks 57 also carry a framework of stainless steel wire articulated at 59 constituting the handles 25 with a right-angled bend 61. The handles can thus assume two stable positions, one indicated by the dotted line 25' and the other by the solid line 25. At the end of the flanks 57, studs 62 can bear along grooves 63 moulded in the side plates 102 and 103. These grooves are hook-shaped as shown at 64 so that the studs 62 can engage in them.

Figure 14:
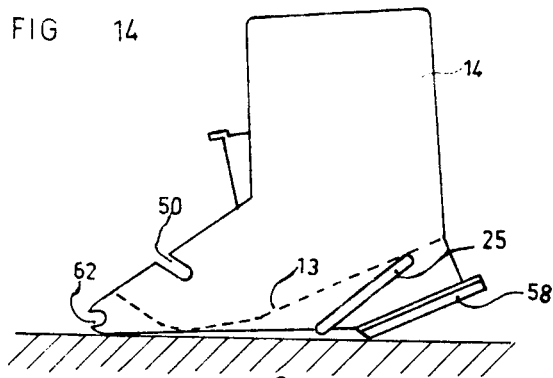
FIGS. 14 to 16 show the various positions which the coating tank can assume during its use.
Figure 15:
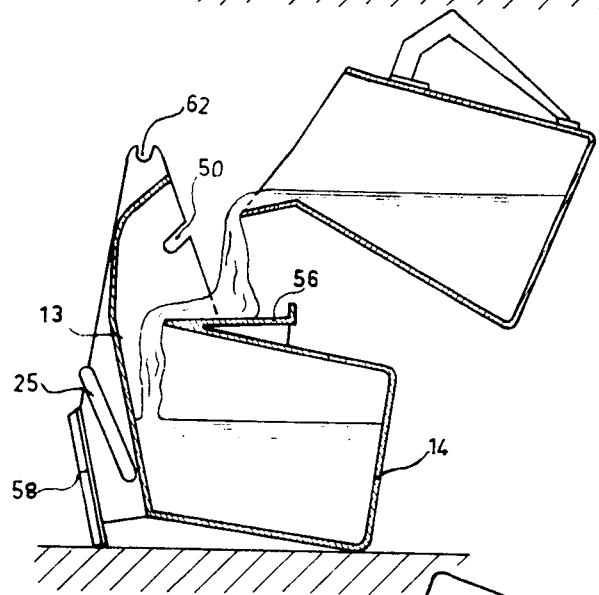
Figure 16:
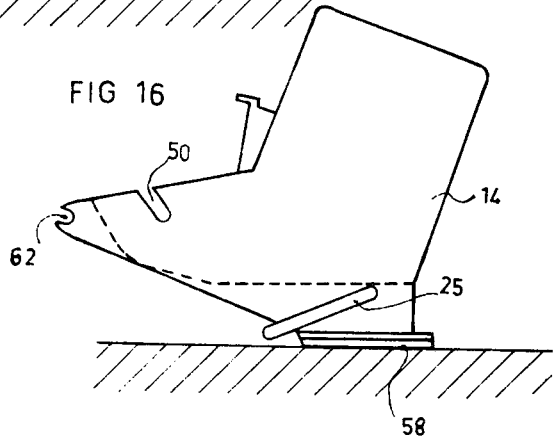

Outside the machine, the reservoir-tank can assume the three positions shown in FIGS. 13, 14 and 15. At rest, it is in the equilibrium position shown in FIG. 14. To fill it, it is placed on its back as shown in FIG. 15, the mix being poured onto the antispill plate 56. The mix then flows into the reservoir, as shown. By turning the reservoir tank through a quarter of a revolution according to the position shown in FIG. 16, the reservoir tank takes up a balanced position on the supporting surfaces 58 and the mix fills the tank. It stabilises at the level 55, the lower part of the front face 54 preventing air from entering above the mix remaining in the reservoir. The roller 15 for entraining the mix can be placed in any position that can be occupied by the reservoir-tank.

The tank-reservoir, as described above, can be difficult to clean so that, in a modified embodiment, it is made in two separable halves, the reservoir and the tank as shown in FIG. 29. The reservoir 128 made of a transparent or translucent plastics material has a peripheral edge formed with two lips 129 and 130 which, in free form, are separated from one another, as can be seen from the left-hand part of the reservoir in the Figure, the tank has a groove 131 in its rear and lateral surfaces to receive the lips of the reservoir. The reservoir/tank assembly is sealed by the inner lip 129 which bears elastically against the side of the groove 131, this assembly of the two components is locked by means of the bead 132 of the lip 130 which engages in a complementary space formed in the groove 131.

In order to fill the reservoir, it is separated from the tank and rested on its base. After filling, it is reassembled with the tank and the lips snapped into the groove by hand pressure. The assembly is returned by rotating it in such a direction that the mix accommodated in the reservoir flows progressively into the tank, the antispill plate 56 is thus eliminated, but this is the only appreciable modification made to the design of the tank-reservoir in a single assembly.

In order to introduce the coater into the machine, the supporting surfaces 58 are placed on the arms 42 of the conveyor (FIG. 8), the studs 62 resting on the rib 63. It is sufficient to push the coater onto the arms of the conveyor until the studs come into contact with the ends of the ribs 63, and then to pivot the handles 25. The handles rest on the arms of the conveyor, the coater tends to pivot and assume the stable position shown in FIG. 8. In its rotating movement about the points 62, a toothed pinion 65 situated at the end of the drive roller engages with the toothed wheel 60 integral with the wheel 113 (FIGS. 11 and 17).

When the stud 62' drops into the hook 64' (cf. left-hand side of FIG. 11), it presses down a plate 67 integral with a microswitch 68 whose functions will be described hereinafter. This microswitch 68 is held in position by riveting to a bracket 69 fitted onto a dummy leaf switch depending from an energy doser 70 which itself is held in position against the side plate 102 by the pressure of the cover 108 on the bracket 69.

In order to lift the coater, it is sufficient first of all to fold the handles back into the position 25' which releases the studs 62 and 62' from the hooks 64 and 64', and lifts the plate 67 off the microswitch 68. The assembly is then drawn towards the rear in order to release and remove the coater.

This system of introduction on tracks slightly different from that shown in FIGS. 5 and 6 has the advantage of enabling the coater to be placed exactly in position without calling for any particular attentiveness on the part of the user. In addition, a deviation of ± 1 mm in the flatness of the support of the machine at the level of the feet 41 of the conveyor (FIG. 8) does not adversely affect the operation of the coating system.

The motor/mechanical transmission assembly of the machine is situated on the right-hand side of FIG. 11 (between the side plate 103 and the cover 109) with a side view in FIG. 10 and a section in FIG. 18 on the line XVIII—XVIII of FIG. 10.

A synchronous electric motor 71 is fixed to two supports 72 and 73 moulded with the side plate 103 through a stirrup 74. The drive pinion 75 meshes with the stepped gearwheel 76 mounted for free rotation on the spindle 77. This spindle which extends through the side plate 103 via the bearing 78 is held radially by the stirrup 74. The pinion 76 meshes with the stepped gearwheel 79 mounted for free rotation on the fixed spindle 80. The pinion 79 meshes with the gearwheel 81 which is coupled to the spindle 77 by the engagement of two metal flats engaged in two grooves formed in the bore of this wheel. Finally, the spindle 77 is forced into the stepped gearwheel 113 – 66 which drives the entraining roller of the coating system and the cooking drum. The wheel 81 meshes with two stepped pinions 82 and 83, the latter driving the sliding pinion 46 which actuates the drive roller 35 of the conveyor.

Figure 19:
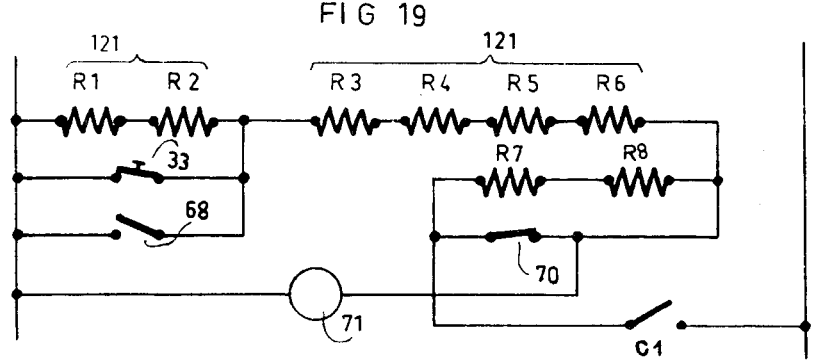
FIGS. 19 to 21 are variants of the circuit diagrams for regulating heating of the cooking drum with a synchronous motor for controlling the machine.

FIG. 19 is a diagram showing the electrical connections in the machine, the resistances 121 wound onto the steatite bars 120 of the cooking roller are denoted by the references $R_1$ to $R_6$. The motor 71 is shed (220V) through a general circuit breaker $C_1$ and the bimetallic energy doser 70 with the heating resistance $R_7$.

At rest, i.e. when the tank/reservoir is not yet in position, the initially high power is reduced through the intervention of the temperature limiter 33 which opens the shunting of $R_1$ and $R_2$ when the temperature at the end of the rod 117 reaches a certain value, in the present case 110° C. This reduction in power corresponds exactly to the natural heat losses of the drum. The temperature of 110° C is the "image" at this moment of the actual temperature of the drum, i.e. around 205° C. Due to the thermal inertia of the infrared resistance elements 121, the temperature of the drum rises to around 210° C following activation of the temperature limiter.

Positioning of the tank/reservoir in the machine closes the microswitch 68 and increase power again by reshunting $R_1$ and $R_2$. Since the pancake mix covers the drum in a semi-continuous manner, the heat loss increases and still corresponds to the energy supplied by the group of resistances under voltage.

Removal of the tank restores power to its expected level by opening the shunt, i.e. the microswitch 68.

It should be noted that, in the event of an accidental drop in the mains voltage, the heat of the energy doser 70 remains proportional to the input voltage so that the average power delivered to the resistances 121 remains constant.

Accordingly, temperature is regulated without any need to use a thermostat accommodated in the drum, which is incompatible with any compact, inexpensive domestic appliance.

The heating cycle of the energy doser 70 can be modified, as shown in FIG. 19, by adding a resistance $R_8$ in series with $R_7$. However, for varying the mean power delivered to the resistances 121 whilst at the same time maintaining the same values for the expected power and the cooking power (for example 240W and 570W, respectively), it is preferred to adopt the circuit illustrated in FIG. 20 with the resistances $R_7$ and $R_8$ to vary the cycle of the energy doser 70. The cooking drum is heated by the resistances $R_3$ to $R_6$.

Figure 21:
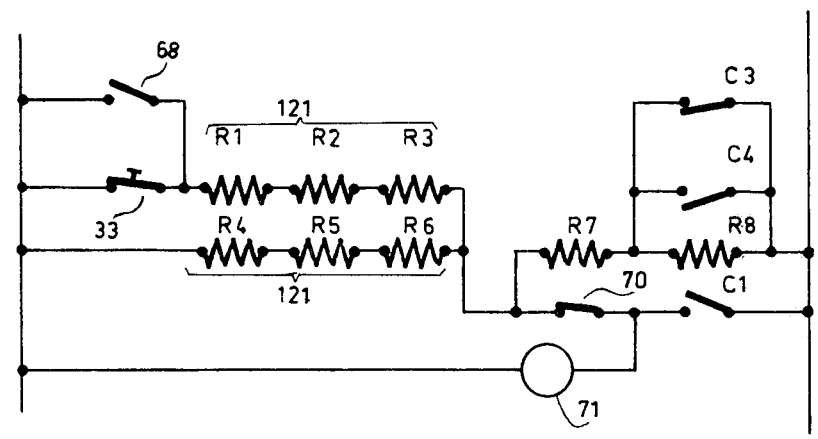

FIG. 21 is the diagram of a third circuit which can be used for controlling heating. In this case, the resistances 121 are connected in parallel to two groups $R_1$, $R_2$, $R_3$ and $R_4$, $R_5$, $R_6$, and change over is carried out by applying voltage to or by removing voltage from the first group. The six resistances 121 each have the same value. The additional resistance $R_8$, for varying the cycle of the energy doser 70, is then shunted by two complementary circuit breakers $C_3$ and $C_4$ operating inversely to the microswitch 68 and to the temperature limiter 33, respectively, by reciprocal connection therewith.

Figure 22:
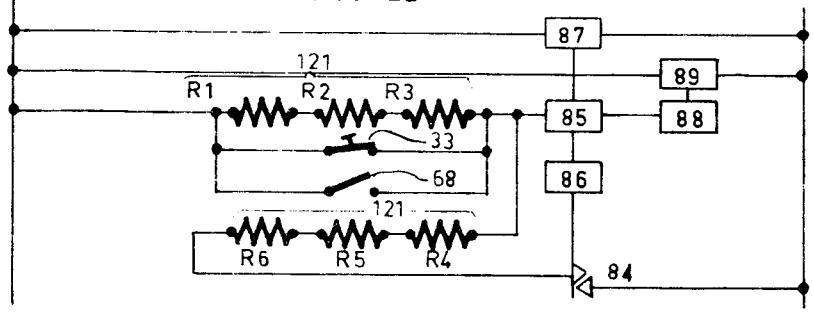
FIG. 22 is another variant, but with electronic regulation using a triac.

It would also be possible to envisage, still with two groups of resistances in parallel on the drum, an electronic circuit arrangement which regularises the mean power delivered to these resistances by all or nothing control, as illustrated in the circuit diagram in FIG. 22, in which the resistances are fed as follows through a triac 84.

To enable the triac 84 to allow a complete sinusoid to pass for a time $t_1$, it must be triggered with each zero-axis crossing of the mains voltage. For this purpose, an impulse is applied to the trigger of the triac 84 through the gate 85 and the impulse amplifier 86 at a moment determined by the zero voltage detector 87, that is to say each time the mains voltage disappears.

A circuit breaker 89 in its closed position enables the gate 85 to apply the impulse to the trigger of the triac 84 via the impulse amplifier 86. The triac is triggered with each zero axis crossing of the mains voltage which is wholly applied to the heating resistances $R_1$ to $R_6$. The circuit breaker in its open position prevents the gate from applying the impulse to the trigger of the triac which is blocked for a time $t_2$ and the resistances are no longer fed.

Control of the circuit breaker 89 closes the circuit breaker 88 for a time $t_1$ and opens it for a time $t_2$. The cycle of duration $t_1 + t_2$ is repetitive and the values of the times $t_1$ and $t_2$ are governed by the effective mains voltage.

In order to shunt the group of resistances $R_1$, $R_2$, $R_3$, it is necessary to use the temperature limiter 33 and the microswitch 68 controlling introduction of the coater of the machine.

A more elaborate embodiment can be obtained by using a single group of non-shuntable resistances and by replacing the temperature limiter with a thermistor acting on the cycle $t_1 + t_2$ and/or by replacing the microswitch with a photoresistance also acting on the cycle $t_1 + t_2$. This new value of the cycle $t_1 + t_2$ defines the standby power.

Unlike the energy doser described above, which produces an all or nothing feed whose cycle extends over several seconds, the power regulator described above has a very short working cycle of less than 1 second and which is only effective for a few alternations.

The machine described thus far is driven by a synchronous motor which generates a constant speed because it is in synchronism with the frequency of the network.

In order to vary this speed, i.e. the cooking time, it is necessary inter alia to use a d.c. motor fed through a variable resistance.

It is of advantage to use a low-voltage micromotor incorporating a permanent magnet. For this embodiment, the current source is derived from the resistances heating the cooking drum.

Figure 23:
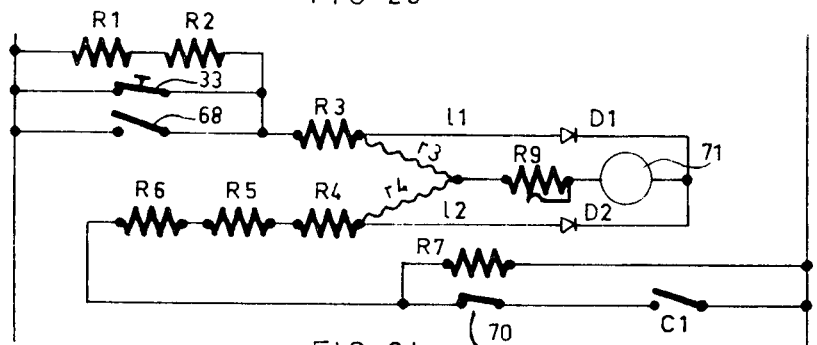
FIG. 23 is another variant of the electrical control system using a d.c. motor for controlling the machine.
Figure 24:
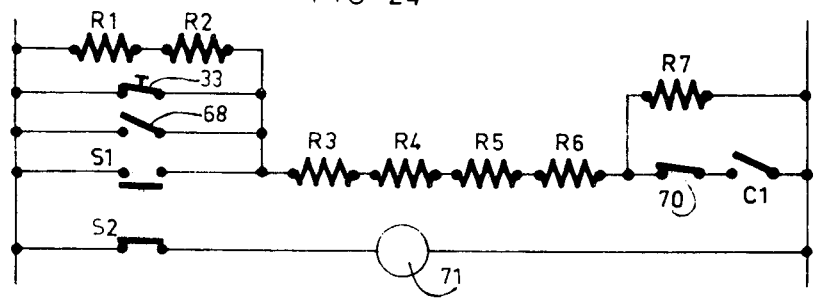
FIGS. 24 and 25 are two modified circuit diagrams completed to enable the surface of the cooking drum to be cleaned by pyrolysis.

The junction between the resistances $R_3$ and $R_4$, which, as has already been seen, is outside the heating cage is replaced in the circuit diagram shown in FIG. 23 by a connection of resistance wire $r_3$ and $r_4$, see FIG. 24, forming a dropping resistance. Non-resistant copper connections $L_1$ and $L_2$ are connected at the ends of the resistances $R_3$ and $R_4$ and, on the other hand, to diodes $D_1$ and $D_2$ through which the motor 71 is fed. Its speed can be regulated by varying the variable resistance $R_9$. By contrast, when the circuit is on standby (33 and 68 open) the voltage derived at $L_1 L_2$ is too low to feed the motor 71 under normal voltage, with the result that the motor stops. Although the fact that the motor is no longer rotating when the coater is introduced, and is stopped when the coater is removed, constitutes an advantage, it then becomes impossible to release the last pancake coated onto the drum because there is a delay of one revolution of the cooking drum between coating and separation of one and the same pancake.

In order to obviate this disadvantage, it is sufficient to only partly fold the handles 25 back under the coater and to maintain the coater in such a position that the bead of mix formed on the entrainig roller no longer comes into contact with the cooking drum. Once the last pancake has been released, the handles can be completely folded down for standby heating. In an alternative procedure, illustrated in FIG. 8, the arm 19 is extended by a lever 50 provided with a key 91 so that, by applying pressure to this key, the stripping bar 17 allows the bead of mix normally accumulating in front of it to flow through. Coating can thus be stopped. However, it is essential to remove the coater as soon as the last pancake has been removed, otherwise the cooking drum will become overheated in the absence of cold mix.

It is apparent from the foregoing description of the machine that all the components coming into contact with the mix can be removed without any need for tools in order to be cleaned or replaced; this is the case with the coater and with the conveyor. So far as the cooking drum is concerned the brown-coloured calamine adhering firmly to it can be automatically removed by pyrolysis.

To this end, it is sufficient to leave all or part of the resistance heating circuit of the cooking drum under voltage. The temperature of the drum settles at an equilibrium temperature defined by the calories applied by the resistances and the natural losses of the cylinder. In the form in which it has been described, with the circuit described with reference to FIG. 19, tests with the machine have shown that the temperature settles naturally at 330° C during cooking, which is the pyrolysis temperature.

Figure 20:
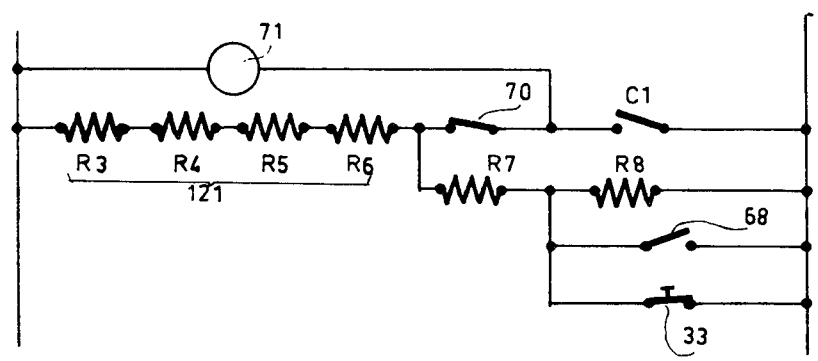
Figure 25:
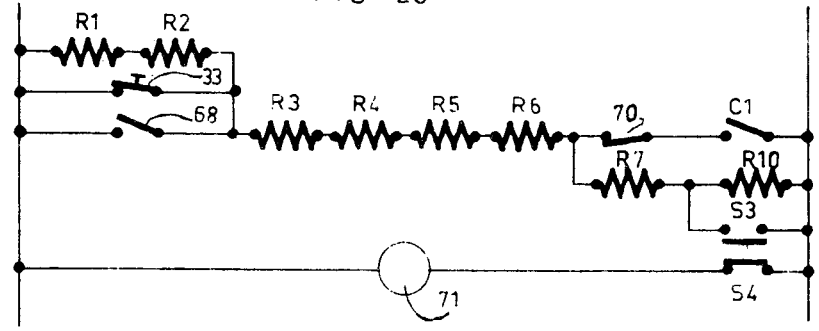

Several solutions can be adopted for obtaining an adequate pyrolysis temperature; for example:

(a) the circuit illustrated in FIG. 19 is completed as shown in FIG. 24. An auxiliary circuit breaker $S_1 S_2$ shunts, on the one hand, the temperature limiter 33 which prevents transfer to the standby circuit ($S_1$), and on the other hand breaks the feed circuit of the motor ($S_2$) to prevent the machine from being used at high temperature;

(b) alternatively, this same FIG. 19 is completed as shown in FIG. 25 a resistance $R_{10}$ normally shunted by a circuit breaker $S_3$ is brought into operation for pyrolysis, whilst the motor circuit is cut ($S_4$). The new heating rate of 70 allows the cooking drum to be overheated in spite of the action of 33;

(c) same arrangement as (b), but for the diagram in FIG. 20, the additional resistance $R_{10}$ (not shown) being placed in series with $R_8$;

(d) adding an auxiliary resistance included in the heating cage and placed under voltage independently of the resistances $R_1$ to $R_6$.

In view of the temperatures reached during pyrolysis, the machine has to be equipped with a safety system, in particular the essential need to dismantle the conveyor and to prevent use of the coater. These safety measures can readily be obtained by means of microswitches placed in series, for example, with $S_1$ (FIG. 24) and actuated by the presence of the aforementioned components.

All the possible mechanical and electrical features of the machine according to the invention have just been described. However, certain structural modifications can be made to this machine without departing from the scope of the invention.

Thus, it has been assumed throughout the foregoing description that the cooking drum has a smooth, continuous surface. However, as shown in FIG. 26, it is possible to use a cylinder 22 with a longitudinal groove 92 sufficiently deep for the top of the bead of mix not to be able to adhere to the bottom of said groove; the groove has a sharp longitudinal edge 92a to stop coating in a clean line, whilst the inclination of the surface 92b is regulated so as not to interfere with the action of the bar or wire by which the cooked pancakes are removed from the drum. Square pancakes are obtained by interrupting the deposition of mix without using a mechanism for lifting the bar 17.

As a variant illustrated in FIG. 27, for making round pancakes, the part 93 of the smooth cylindrical surface can be covered with a layer of antistick material, such as PTFE, so as to leave a smooth disc 94 on which the pancakes are cooked.

In addition, it has already been seen, in reference to FIG. 11, that the cooking drum rotates via internally toothed wheels 105 and 113. In order to avoid excessive stressing of the insides of these wheels, the drum can be mounted on smooth wheels with a mechanism for automatically taking up play on the driving side. This mechanism will be described hereinafter with reference to FIG. 28.

A curved arm 95 is mounted on a spindle 96 about which the smooth roller 97 rotates. This curved arm 95 is designed to oscillate through a certain angle (arrows $98_1 98_2$), a short lever 99 riveted to the end of the spindle 86 is permanently under the action of a spring 100 so that the arm tends only to be displaced in the direction of the arrow $98_1$.

The free end of the arm 95 carries the spindle 114 about which rotates a second smooth wheel 115.

Since the drive pinion 113 rotates in the direction of the arrow f, the cooking drum is driven in the direction of the arrow F which tends to apply the path of rotation of the drum to the wheel 97 and, hence, to allow the arm 95 to act in the required direction of the arrow $98_1$. The arm 95, the spindle 114 and the smooth idle wheel 115 rotating on a path formed in an end zone of the inner wall of the cooking drum are shown in a circle and in axial section at the top and on the right-hand side of FIG. 11.

Finally, in cases where it is desired to vary the length of the pancakes on the machine as essentially described in the foregoing, instead of controlling lifting of the bar 17 by means of the projection 21 arranged at the end of the cooking drum, it is necessary to replace this projection by a mechanism acting, for example, every one and a half revolutions or every three quarters of a revolution. This mechanism is only suitable for compact machines and could consist of a disc turning somewhat more slowly or quickly than the cooking drum, this disc carrying a pin periodically engaging the bar 17 to lift it.

I claim:

1. A method for applying a cooking mix to the cylindrical cooking surface of the rotating cooking drum of an automatic machine for making pancakes, whereby a coating of the mix is selectively applied to the cooking surface, comprising the steps of: providing a rotating drum;

entraining a film of mix by adhesion on the surface of a continuously rotating mix-entraining roller partly immersed to a substantially constant depth in a tank containing the mix, said roller rotating oppositely from the direction of rotation of said drum and being located generally below said drum in confronting relationship, the mutually opposite surfaces of said roller and said drum being spaced apart a distance greater than the thickness of the layer of mix entrained by adhesion on said roller;

tangentially contacting the surface of said roller with a retaining member immediately after the zone wherein the surfaces of said oppositely rotating roller and drum are closest to one another for partly retaining the entrained film of mix on said roller so as to thereby produce a bead of mix which extends across the distance between said roller and said cooking drum to touch and coat said cooking surface of said drum, to start the cooking of a pancake; and subsequently disengaging said retaining member from said roller so as to thereby terminate the formation of said bead of mix, thereby terminating the application of mix to said cooking surface.

* * * * *